United States Patent [19]

Bohrman

[11] Patent Number: 5,109,482
[45] Date of Patent: Apr. 28, 1992

[54] INTERACTIVE VIDEO CONTROL SYSTEM FOR DISPLAYING USER-SELECTABLE CLIPS

[76] Inventor: David Bohrman, 424 Valley Rd., Cos Cob, Conn. 06807

[21] Appl. No.: 657,675

[22] Filed: Feb. 19, 1991

Related U.S. Application Data

[63] Continuation of Ser. No. 462,718, Jan. 9, 1990, abandoned, which is a continuation-in-part of Ser. No. 295,712, Jan. 11, 1989, abandoned.

[51] Int. Cl.⁵ .................................................. G06F 15/62
[52] U.S. Cl. .................................................... 395/154
[58] Field of Search ................. 364/518, 521; 358/93, 358/107, 327, 342; 235/375; 360/86; 434/107, 108, 236, 307, 308, 323, 337

[56] References Cited

U.S. PATENT DOCUMENTS

| | | | |
|---|---|---|---|
| 4,000,510 | 12/1976 | Cheney et al. | 364/900 |
| 4,386,375 | 5/1983 | Altman | 358/342 X |
| 4,602,907 | 7/1986 | Foster | 434/337 |
| 4,775,935 | 10/1988 | Yourick | 235/375 X |
| 4,798,543 | 1/1989 | Spiece | 434/323 |
| 4,804,328 | 2/1989 | Barrabee | 434/308 |
| 4,863,384 | 9/1989 | Slade | 434/307 X |

*Primary Examiner*—Heather R. Herndon
*Attorney, Agent, or Firm*—Dorsey & Whitney

[57] ABSTRACT

A method and apparatus for controlling the presentation of information previously recorded on a videodisc player enables a user to simply and efficiently select and playback user-specified segments of the information prerecorded on the videodisc in an order individually determined by the user. Instantaneous access to video and audio information can be controlled precisely so that preselected portions of the recorded information can be accessed at any time. All portions of selected segments can be chosen. In addition, all or selected portions of any amount to the prerecorded information can be sequentially accessed by the user of the system.

16 Claims, 10 Drawing Sheets

Fig. 8

ABCD FILE FORMAT--ABC NEWS INTERACTIVE™

THE STANDARD 
    1. LINE UP NAME
    2. NUMBER OF CLIPS IN LINEUP
    3. INDIVIDUAL CLIP PARAMETERS
        1. TITLE LINE
            1. • OR +
            2. CLIP LENGTH (AT RAW, NORMAL FORWARD SPEED)
            3. CLIP NAME
        2. DEVICE
            1. SERIALLY-CONTROLLED VIDEODISC
            2. SERIALLY-CONTROLLED 8mm TAPE DECK
            3. CD-ROM
            4. MACINTOSH CPU
            5. CD-AUDIO
            6. APPLE TRACK NETWORKED DEVICE
        3. IN POINT
            1. FRAME NUMBERS FOR VIDEODISC
            2. TIMECODE FOR 8mm TAPE
            3. CD-ROM ADDRESS
            4. PATHNAME:FILENAME FOR CPU 4. OUT POINT
            1. FRAME NUMBERS FOR VIDEODISC
            2. TIMECODE FOR 8mm TAPE
            3. CD-ROM ADDRESS
            4. AUDIO TRACK/CLIP/BLOCK FOR CD AUDIO
        5. SPEED
            1. FOR VIDEODISC
        6. DIRECTION
            1. FOR VIDEODISC
        7. AUDIO SETTINGS
        8. COMMENTS
        9. TIMING/PAUSES
    4. HYPERTALK CLIP COMMANDS
        1. TIMING AND PAUSES
        2. EXTERNAL DEVICE CONTROL COMMANDS
        3. CALLS TO EXTERNAL COMMANDS AND FUNCTIONS

INTERACTIVE VIDEO CONTROL SYSTEM FOR DISPLAYING USER-SELECTABLE CLIPS

RELATED APPLICATIONS

This is a continuation of application Ser. No. 462,718, filed Jan. 9, 1990, now abandoned, which is a continuation-in-part of Ser. No. 295,712, filed Jan. 11, 1989 by the same inventor of the present application and also entitled "INTERACTIVE VIDEO CONTROL SYSTEM" now abandoned.

TECHNICAL FIELD

The present invention relates generally to the selective playing of information which is prerecorded in a random or nonrandom manner on a videodisc player. More particularly, the present invention relates to a method and apparatus for controlling the presentation of information previously recorded on the videodisc player that enables an end-user to easily select, edit and playback user-specified sequences of segments or "clips" of the information prerecorded on the videodisc by manipulating symbols on a computer system that represent these clips of information.

BACKGROUND

A large amount of analog or digital data can be stored on a recording medium, such as a videodisc. In the past, to display that information, even with professional systems, has been a creative and time-consuming task, particularly if a selected sequence of the information was to be displayed in a sequence that is different than the sequence in which the information was originally recorded on the recording medium. Generally, an editing process was required, usually involving two recording media. The recording device upon which the information was originally stored had to be precisely controlled to begin and end at the start and stop positions which were to be displayed in the subsequent edited version. This first recording source then had to be carefully synchronized with a second recording source, upon which would be recorded in the medium. Subsequently, if any changes were desired in the sequenced presentation, it was generally necessary to re-edit the recorded sequence to increase or decrease the amount of recorded information to be presented or to add or delete information.

Some effort has been directed to simplifying these tasks by the creation of video drivers that enable a computer system to control a videodisc player in the same functional manner that manual controls control the player. (e.g., U.S. Pat. No. 4,449,198). In another system, the user of such a computer system generates a call code or identification byte that is then used by the videodisc player to search for the particular frame number on the videodisc that the user desires to have played. (e.g., U.S. Pat. No. 4,635,136) Still another system uses multiple videodisc players to generate video still pictures based on the sequence of still pictures stored in an external picture program. (e.g., U.S. Pat. Nos. 4,796,099, 4,717,971, and 4, 675,755) Generally, however, such systems have required, at a minimum, an understanding of both programming languages to control the computer system and the control functions of the particular videodisc system.

What has been needed is an integrated and interactive control system that allows the user to access to any portion or any sequence of portions of prerecorded information in a manner that enables the simple and efficient selection, editing and playback of the portions in a manner that is individually determined by the end-user, without requiring the end-user to possess a detailed understanding of how to operate the computer system or the videodisc player. This is particularly important when the combined videodisc player and computer system are to be used as part of an educational program intended for primary or secondary school students.

The present invention is directed to that need.

SUMMARY OF THE INVENTION

The present invention relates to a method and apparatus for controlling the presentation of information previously recorded on a videodisc player that enables a user to simply and efficiently select and playback user-specified segments of the information prerecorded on the videodisc in an order individually determined by the user. Instantaneous access to video and audio information can be controlled precisely so that preselected portions of the recorded information can be accessed at any time. All portions of selected segments can be chosen. In addition, all or selected portions of any amount to the prerecorded information can be sequentially accessed by the user of the system.

The interactive video control system provides a unique way of manipulating video via computer. In its first implementation, utilizing a Macintosh ® computer and a laser videodisc player, any video sequence contained on the disc is not only immediately accessible for viewing, but can be instantly customized, and replayed--either individually or in a group, in any order the user desires. Easier to use than a video editing system, the present invention is markedly different from a traditional video editing system because it uses only a single-video element. The present invention does not edit from something to something else. Instead, the apparatus of the present invention quickly, and at the user's control, seeks out and replays the desired video clips automatically (if desired) from just the video source.

The order in which the video is organized on the videodisc is not really important. A standard CAV videodisc can store approximately 54,000 frames of video. Each frame has a number, and any frame can be precisely reached. In the system of the present invention, all clips (either the preselected clips or custom-made clips chosen by a user) are referred to merely as a pair of frame numbers... a start frame and a stop frame. This allows the same sequence of video information to be part of many different clips.

In addition to precise and rapid video replays, the system has the capability to retrieve background editorial information about the video segments, which the user can review and manipulate as desired, or add user-created textual information about the selected clips. The system also allows the user to store the control information for the user-selected clips in a computer-accessible file format such that a teacher, for example, could later retrieve and play the clip created by the user. Another feature of the present invention is the capability of relating textual information with the video clips being displayed. The textual information can be either the background editorial information or the actual text of the audio of a video segment. For example, it is possible to allow the user to view the textual information of an entire speech and thereby select the sentence or paragraph from the textual information that will drive display of the corresponding video segment.

The operational flow of the preferred embodiment of the present invention is highly variable because of the use of the HyperCard program and HyperText programming language on the Apple Macintosh computer. For a typical selection of a custom clip, a preselected video segment that is selected by the user is displayed on the TV monitor. At this point, the user is in a Custom Clip Maker card and the frames of the preselected video segment are then displayed. A check is made to see if the user has selected the frame being displayed as the "in" point for the custom made clip. If so, then the frame number of the present frame is stored as the "in" point. A check is also made to see if the user has selected the frame being displayed as the "out" point for the custom made clip. If so, the program checks to see if an "in" point has already been selected. It not, an error message is generated and the user is returned to select a video segment. If an "in" point is already designated, then the frame number of the present frame is stored as the "out" point of the custom made clip. If the present frame number is not selected as an "in" or "out" point, a check is made to see if the preselected video segment has ended, and if so, an error message is generated and the user is returned to select a video segment. With the 'in" and "out" points for the custom clip marked, the user may use the Custom Clip Maker card to fine tune the start and stop points of the custom clip. The custom clip is then named and added to a pull-down list of clips.

Once the custom clip has been created, it can be added to a lineup showing the list of available clips that includes both custom clips and preselected clips. Using a Lineup Maker card, one of the custom clips or one of the preselected clips is selected as the clip to be displayed in the lineup. The user may modify the selected clip by, for example, modifying the speed at which the clip is to be played back, and the user may rearrange any or all of the clips that are listed in the lineup. Each clip is represented as a uniquely selectable and modifiable button in terms of how the HyperCard program views the clips. Once the clips are in the desired order as selected by the user, the user may play back the lineup in the order that the custom clips are listed in the lineup.

It is an objective of the present invention to provide an integrated and interactive control system that allows the user to access to any portion or any sequence of portions of prerecorded information in a manner that enables the simple and efficient selection, editing and playback of the portions in a manner that is individually determined by the end-user.

It is a further objective of the present invention to provide a computer system that operates as a controller for a videodisc player that enables the end-user to playback one or more user-selected custom clips without requiring the end-user to possess a detailed understanding of how to operate the computer system or the videodisc player.

It is another objective of the present invention to provide a method and apparatus for controlling the presentation of information previously recorded on a videodisc player that enables an end-user to easily select, edit and playback user-specified sequences of segments or "clips" of the information prerecorded on the videodisc by manipulating symbols on a computer system that represents these clips of information.

It is a still further objective of the present invention to provide a method and apparatus for controlling the presentation of information previously recorded on a videodisc player that enables a user to create, name and store the control information associated with user-specified "clips" of the information pre-recorded on the video disc such that the control information may be later retrieved to enable the playback of the associated user-specified clip.

These and other objectives of the present invention will become apparent with reference to the drawings, the detailed description of the preferred embodiment and the appended claims.

DESCRIPTION OF THE DRAWINGS

FIG. 8 is a listing of the control information associated with a Lineup that may be saved on disc or in the memory of a computer.

DESCRIPTION OF THE PREFERRED EMBODIMENTS

Figure 1:
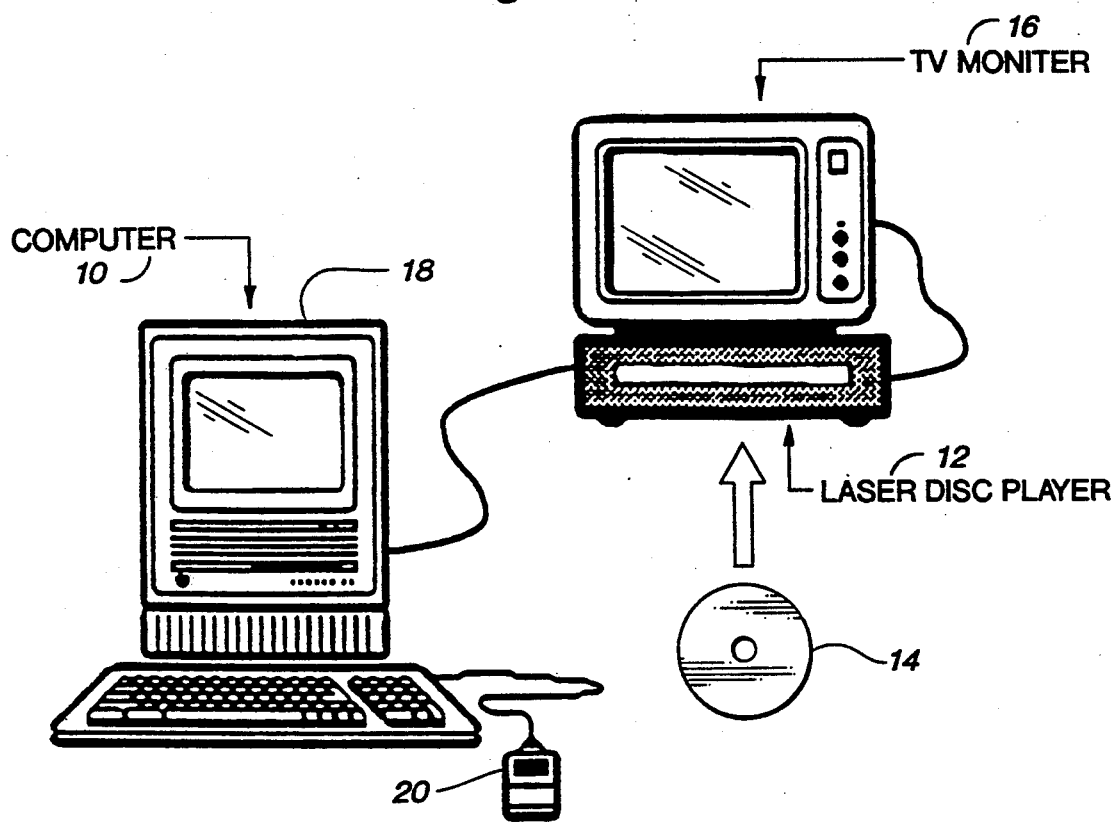
FIG. 1 is a schematic representation of the various hardware components of the preferred embodiment of the present invention.

To provide a context in which to understand the present invention, a sample curriculum and videodisc embodying the preferred embodiment of the present invention will be described. As shown in FIG. 1, the preferred embodiment of the present invention is programmed as a HyperCard ® program running on an Apple Macintosh ® computer 10 that controls the operation of a Pioneer ® LD-2200, LD-V4200 or LD-V8000 videodisc player 12 that can display video images recorded on a videodisc 14 on a TV or display monitor 16. In this embodiment, the display monitor 16 is separate from the monitor or screen 18 associated with the computer 10. It will be recognized, however, that it is possible to have both the cards and the video images displayed on a single monitor using either a split screen or windowing technique as is well known in the art. It should also be recognized that any variety of computer systems and videodisc players or other means for displaying stored video information could be used in connection with the present invention.

The following discussion of the preferred embodiment assumes that the reader is generally familiar with the operation of the HyperCard ® program on the Apple Macintosh ® computer. For a detailed description of the operation of the HyperCard program, reference is made to the Macintosh ® HyperCard ® User's Guide, Publ. No. 030-3081A, 1987, available from Apple Computer, Inc., 20525 Mariana Avenue, Cupertino, Calif. 95014.

Figure 2A:
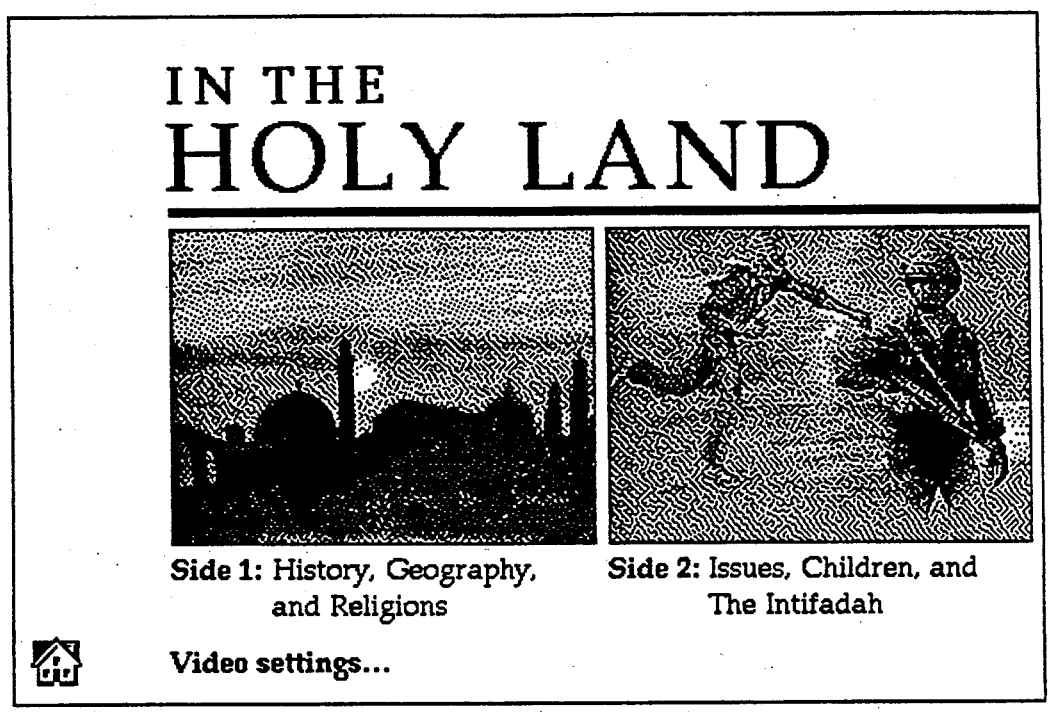
FIGS. 2a, 2b, 2c and 2d are pictorial representations showing an initial sequence of frames (cards) representing the displays on a computer screen in accordance with the preferred embodiment of the present invention.
Figure 2B:
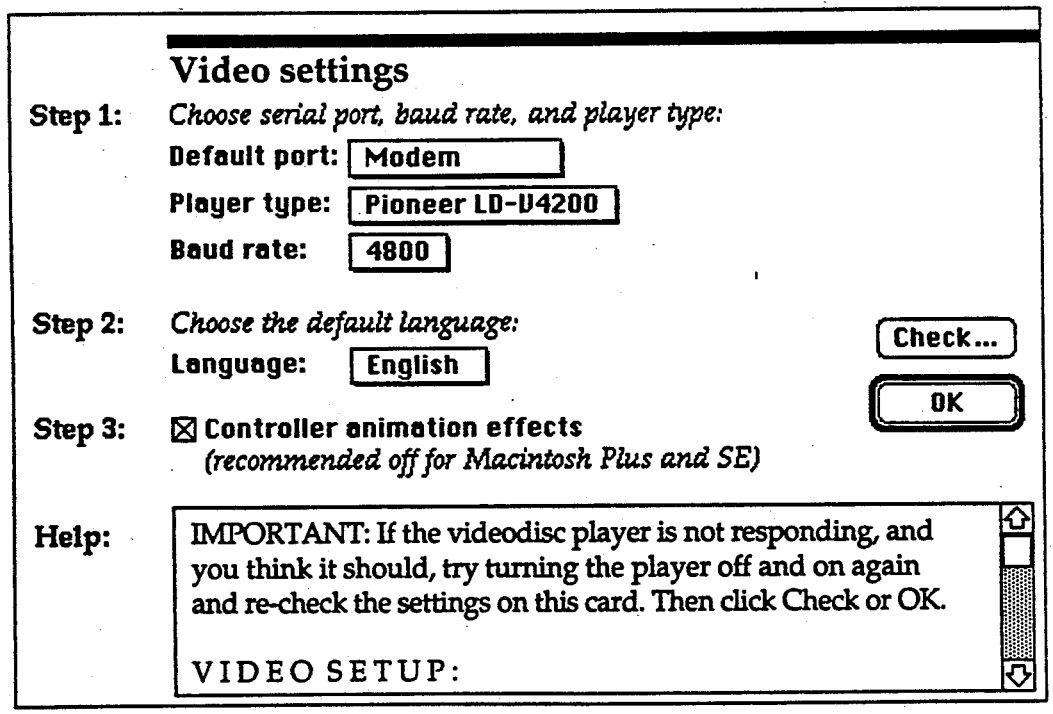
Figure 2C:
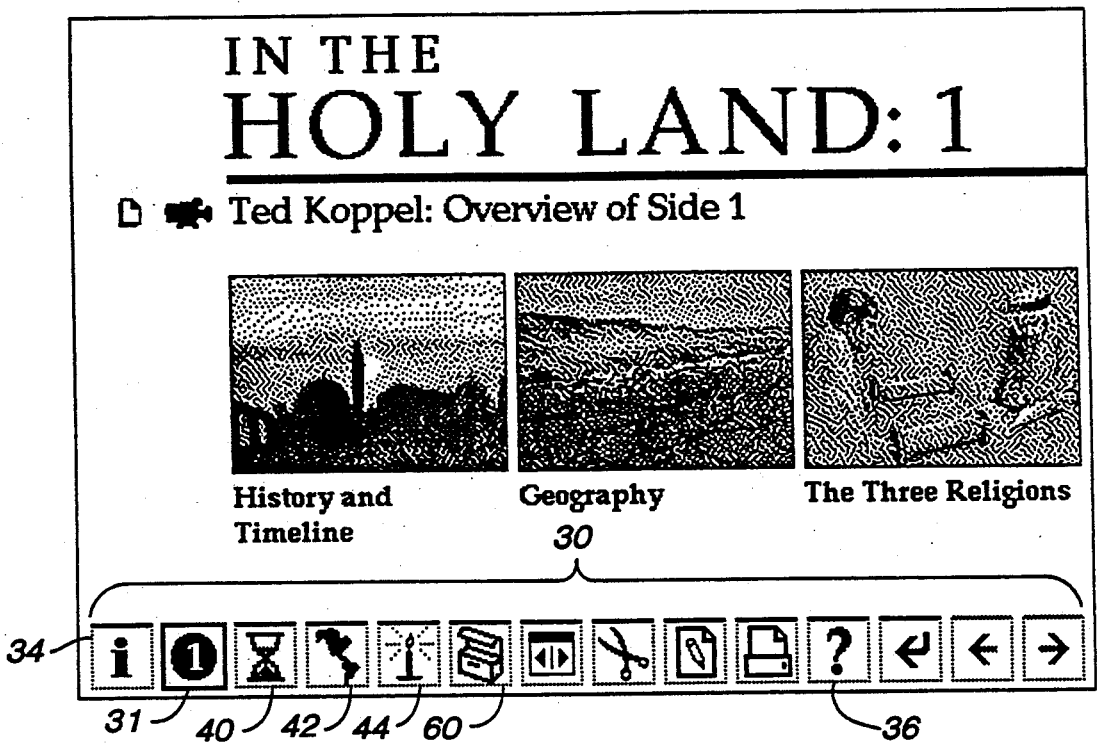
Figure 2D:
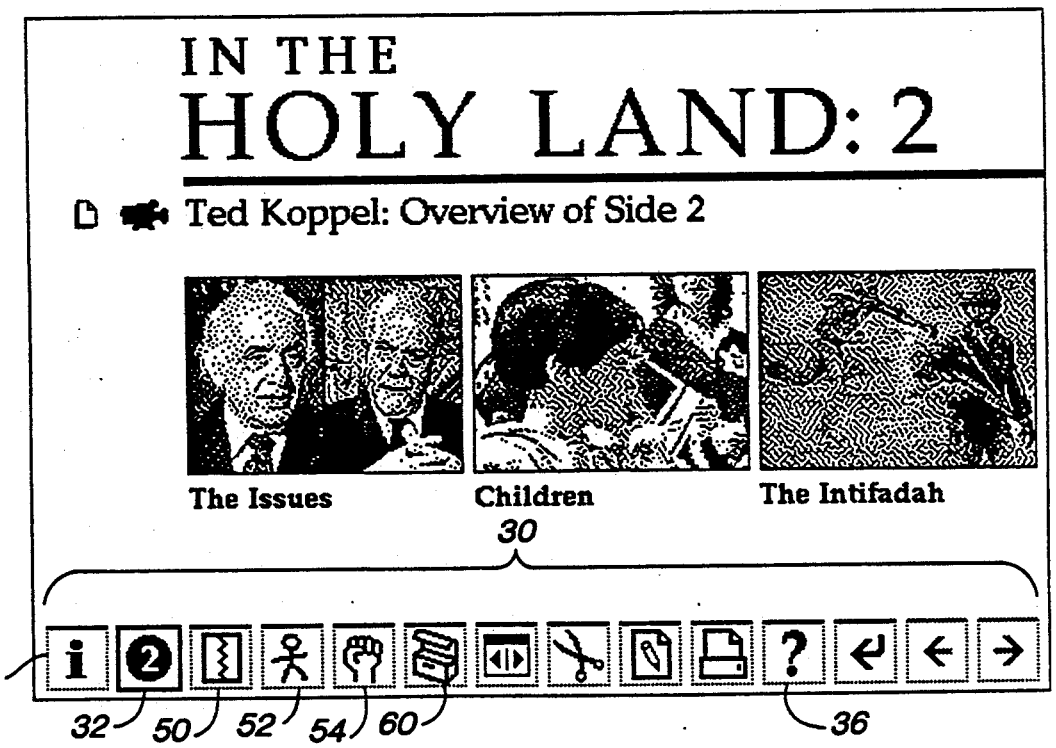

In the preferred embodiment shown in FIGS. 2a-2d, several pictorial representations of frames of computer screen (referred to as a card) from the "In the Holy Lands" version of the present invention are shown. Beginning with FIG. 2a, the appropriate HyperCard stacks containing the programing instructions in accordance with the present invention have been loaded into the computer 10 and a user has activated the program to cause the card shown in FIG. 2a to be displayed on the monitor 18. The stacks for the specially modified HyperCard program of the present invention are now operational. Operational flow proceeds to the next card, shown in FIG. 2b, where the user may change the default settings for videodisc player 12, as well as the default language that will be user for the audio track of he videodisc 14. If the user wishes to proceed immediately to the materials, the user may double-click on Home icon using a mouse 20 or similar pointing device associated with the computer 10. When the videodisc default setting have been modified or skipped, operational flow proceeds next to a cared showing the various topics present on Side 1 of the videodisc 14 (FIG. 2c) and Side 2 of the videodisc 14 (FIG. 2d). Although the preferred embodiment is implemented using a two-sided videodisc 14, it will be recognized that the present invention would work equally as well with a single-sided videodisc.

As the user moves through the various In the Hold Land stacks and cards, the user will find that bold words indicate that there is more information available. By clicking on any bold word, the user may branch off and explore that segment of information in the material. While any video segment is playing on the videodisc player 12, hitting the TAB key on the computer 10 will pause the video. Hitting TAB again will resume play.

The key to fast and easy navigation throughout the system is the bottom row of buttons 30 as shown in FIGS. 2c and 2d. The buttons 30 are where the user decides which side of the videodisc 14 the user wishes to explore. If the user get lost, the user can always return to the Side One menu (button 31) or the Side Two menu (button 32), or to any of the major modules directly from this feature that is found on every card in the system. To change sides, the user may also click the button 34 on the bottom row to the far left side of the card which resembles a bold lower case "i." For more information o the bottom row of buttons 30, and to learn where the different buttons will take the user, the user may choose the Help button 36 represented by the question mark on the bottom row.

Each of the cards shown in FIGS. 2c and 2d contain a number of buttons 30 relating to the modules present on each of the videodisc 14. Side One focuses on the History module (button 40), the Geography module (button 42) and the Religion module (button 44). Side Two deals with the Issues module (button 50), the Children module (button 52) and the Intifadah module (button 54). Common to Side One and Side Two is the Resource module (button 60) which is further divided into glossary definitions, biographies and documents.

SIDE ONE MODULES

The History modules is essentially a visual timeline of the major events during the last one hundred years in the Middle East. This module is the primary source of information on this side of the videodisc 14. The user can learn about and study the key events which have taken place during the last one hundred years of Middle East history. The user can choose to view events in alphabetical or chronological fashion, or zoom in on the timeline itself. To explore the timeline, the user first clicks on any of the blocks of time. From there, clicking on an event itself takes the user to information about that event, or clicking again on the timeline takes the user even deeper into the timeline.

Major video support, if it is available for that event, can be found above the horizontal line on the information card. Perspectives takes the user to a card from which the user can weigh different views of the historical event. Other supporting information such as documents, maps, biographies and file video is available below the horizontal line. File video events are silent. It will be understood that bold words link to additional support in the Resource module.

In the Geography module, the user can learn about the land itself, and how the land is central to the history, conflict and controversy of the region. Ted Koppel's overflow report gives a look at the lands that make up this troubled region. Individual maps, including demographic information on individual countries can be studied. Unique geographic "comparisons" let the user see just how close together the nations of the Middle East actually are. The user can select to compare the geography of the Middle East with five different regions of the United States.

The Religion module lets the user explore thousands of years of history focusing on the city of Jerusalem. The user can learn about the three major religions in this embattled city. The user can see how the clash of religions has provided battles among armies throughout history. The user can read World Book Encyclopedia entries on the background of Islam, Judaism and Christianity. Maps, pertaining to the troubled biblical history of the region, can be studied and viewed with respect to modern political boundaries.

SIDE TWO MODULES

In the Issues module the use can listen to both sides of current debates involving the Holy Land. Israeli and Palestinian the youngsters give their perspectives of life in the Holy Land in the Children's module. Many of these issues have been brought into focus by the Intifadah, or uprising. Some background on the uprising is provided in this third module. In this section, Israeli, Palestinian, American, Soviet leaders and other decision makers give their thoughts on the turmoil in the Holy Land, and what needs to happen to achieve peace and understanding.

By selecting a topic from the issues menu (not shown), the user will see general information about each issue. Supporting material is available by clicking on bold words or by choosing events from below the horizontal line on the card. Primary video support can be found by choosing the perspectives section. Once there, clicking on the large Play button plays both viewpoints edited together. By clicking either of the pictures individually, the user will get just that viewpoint.

In the Children's module, Israeli and Palestinian youngsters speak about life in the Holy Land. The user have the option of playing statements from each group of children as one continuous video segment, or hearing from each of the children in either group individually.

The Intifadah module, or the uprising on the West Bank and Gaza Strip, brings the issues explored on this side of the disc into focus. The Intifadah module lets the user briefly explore the uprising itself, and see why it has been so powerful.

THE DOCUMENTARY MAKER

Referring now to FIGS. 3-7, the Documentary Maker of the preferred embodiment of the present invention will be described. The user-selected video clips that form the user's "documentary" are assembled during a "lineup," in which a sequence of video clips is specified by the user. The Documentary Maker lets the user construct a user-selected lineup from the video material stored on the videodisc 14. The Documentary maker has three components—the Presentation Control card 100, the Custom Clip Maker card 120 and the Lineup Maker card 140. With a two-sided videodisc system, duplicate cards 100, 120 and 140 for each side of the videodisc 14, along with an identification card, make up the cards for the Documentary Maker.

Figure 3:
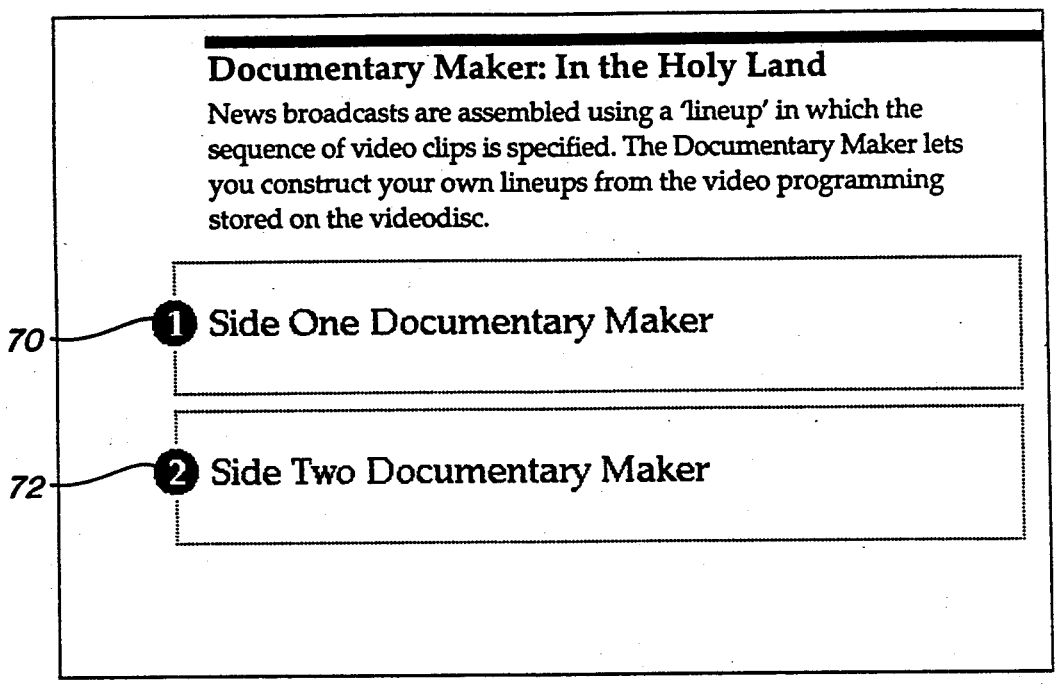
FIG. 3 is a pictorial representation showing an introduction card for the Documentary Maker.

FIG. 3 shows the introduction card that introduces the user to the Documentary Maker and allows the user to select which side of the videodisc 14 if the user is not presently operating on a particular side of the videodisc 14 that will be used for constructing the user-selected lineup of video segments or clips. If the user is already on Side 1 or Side 2, selecting the scissors button 90 as described below will take the user to the Documentary maker for the side of the videodisc 14 that the user is currently working with and the introduction card will not be displayed. In this embodiment, the user is limited to selecting clips from either Side 1 or Side 2 of the videodisc 14 by using button 70 for Side 1 and button 72 for Side 2. It will be recognized that the invention could be programmed to allow the user to select clips from both sides of the videodisc 14, however, a significant delay in viewing consecutively ordered clips that the user has selected for a lineup will occur if current videodisc players 12 are used to replay such a lineup.

THE VIDEO CONTROL PANEL

A video control panel 80 (as shown, for example, in the rightmost portion of FIG. 4) lets the user control the functions of the videodisc player 12. Clicking the controller button 82 in the bottom row to show or hide the video control panel 80. When viewing most pre-programmed video segments within the system, a small version of the control panel 80 will pop up on the computer monitor 18. Additional controls for the videodisc player 12, such as different speeds, audio settings, etc. can be found by expanding the control panel 80 (to do this, the user clips the zoom box 84 at the top right of the panel). To learn more about how to use the expanded the control panel 80, the user may go to the Help system via the question mark 36 on the bottom row of buttons, and then select the video control button 82. The user will be able to click on any part of the control panel 80 and find out what it does.

THE PRESENTATION CONTROL CARD

Figure 4:
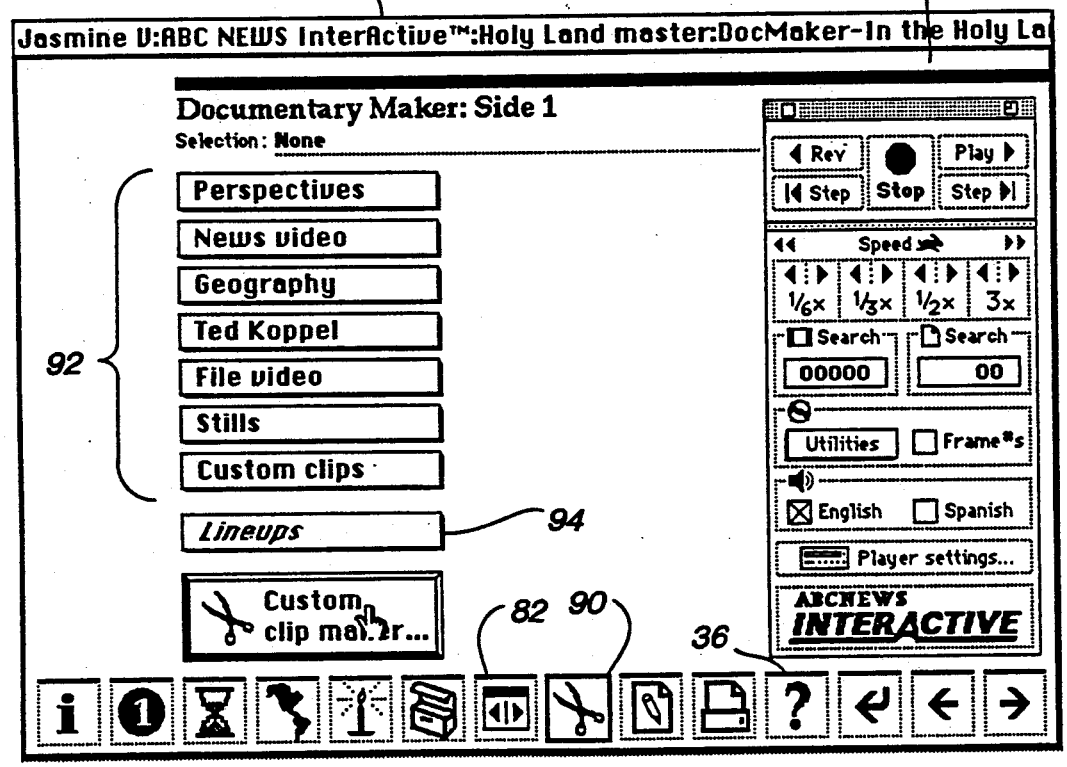
FIG. 4 is a pictorial representation showing the Presentation Control card for the Documentary Maker.

When the user clicks the scissors button 90 in the bottom row, the Documentary Maker Presentation Control card 100 will appear on the monitor 18, as shown in FIG. 4. The user can control all of the video clips on the videodisc 14 with this card quickly and easily. The preprogrammed video segments available on each side of the videodisc 14 are listed under the large buttons 92 down the left side of the card 100. When the user presses and holds down any of the large buttons 90, a pop-up menu will appear listing all of the preprogrammed video segments associated with that particular large button. In essence, the user has up to one hundred videotape machines cued up and ready to roll with preprogrammed video segments. When the user selects a preprogrammed segment form the particular pop-up menu, the Documentary Maker cues up the first frame of that particular video segment. The user can play, rewind, speed up or slow down the clip with the control panel 80 on the right side of the card.

THE CUSTOM CLIP MAKER CARD

Figure 5:
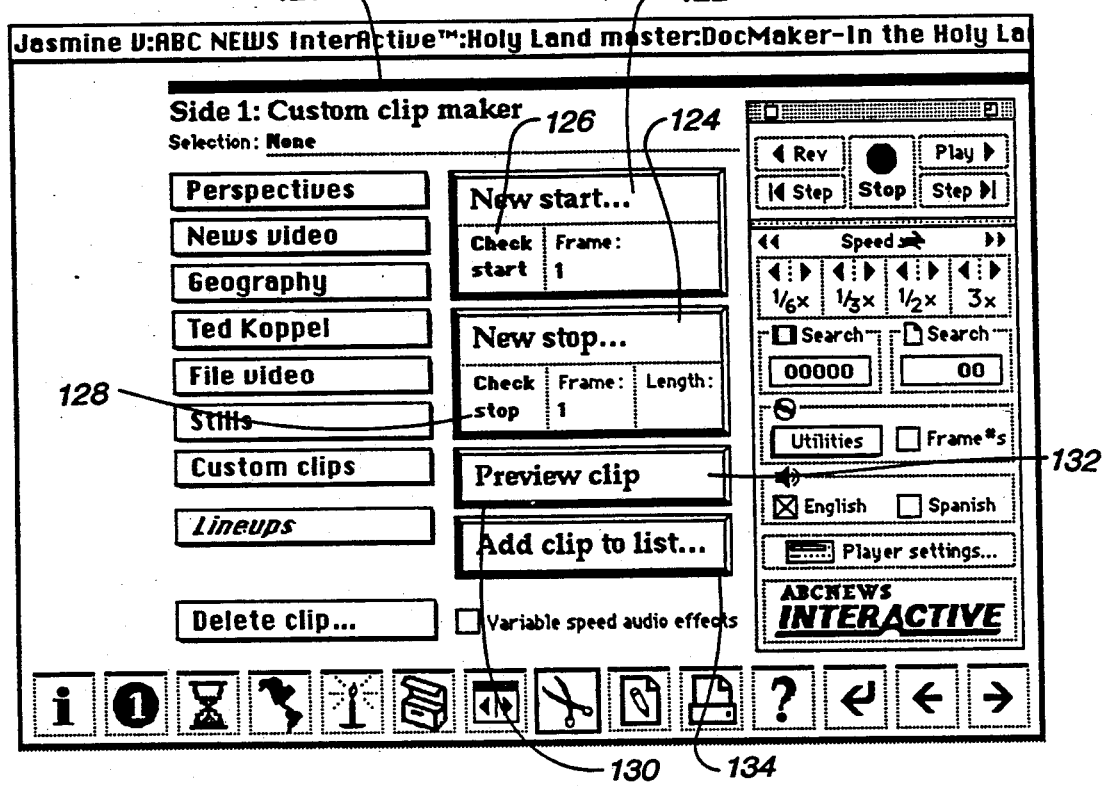
FIG. 5 is a pictorial representation showing the Custom Clip Maker card for the Documentary Maker.

All of the user-selected custom made video clips begin at an "in" point and end at an "out" point. With the Custom Clip Maker card 120 as shown in FIG. 5, the user can specify one or more user-selected video clips and add them to the Presentation Control card 100 under the Lineups large button 94. To create a user-selected or custom made clip, the user first selects a preprogrammed video segment from one of the pop-up menus using the large buttons 92. The user then clicks Play on the control panel 80. As the video segment is playing, the user clicks the New Start button 122 to mark a new "in" point and the New Stop 124 button to make anew "out" point. When marking "in" and "out" points as the video is played at full sped or "on the fly," the user may use visual or audio cues in the video, e.g., a raised eyebrow, a cleared throat, a scene change, to identity the desired "in" and "out" points. If the user does not select a new "in" point or a new "out" point, the system uses the "in" and "out" points for the video segment that is being played.

After the clip has been marked, the user can check the "in" and "out" points with the Check Start and Check Stop buttons 126 and 128. The user also can watch the entire clip with the Preview Clip button 130. Most likely, the "in" and "out" points will need fine tuning. By using the Step button 132 to find the perfect edit point, the user may perform such fine tuning. When the user is satisfied with the "in" and "out" points of the clip, the user can name the clip and add it to the pull-down list with the Add Clip to List button 134. The clip will now appear in the pull-down window associated with the Lineups button 94. It also will be added to the presentation control card in the Custom Clips list.

THE LINEUP MAKER CARD

Figure 6:
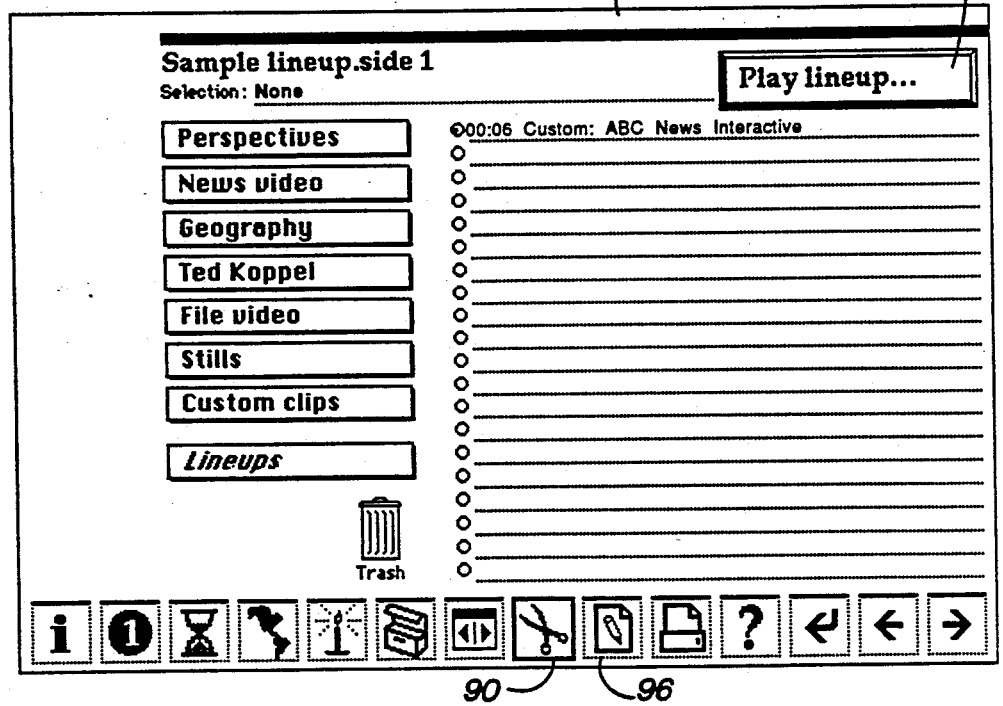
FIG. 6 is a pictorial representation showing the Lineup Maker card for the Documentary Maker.
Figure 7:
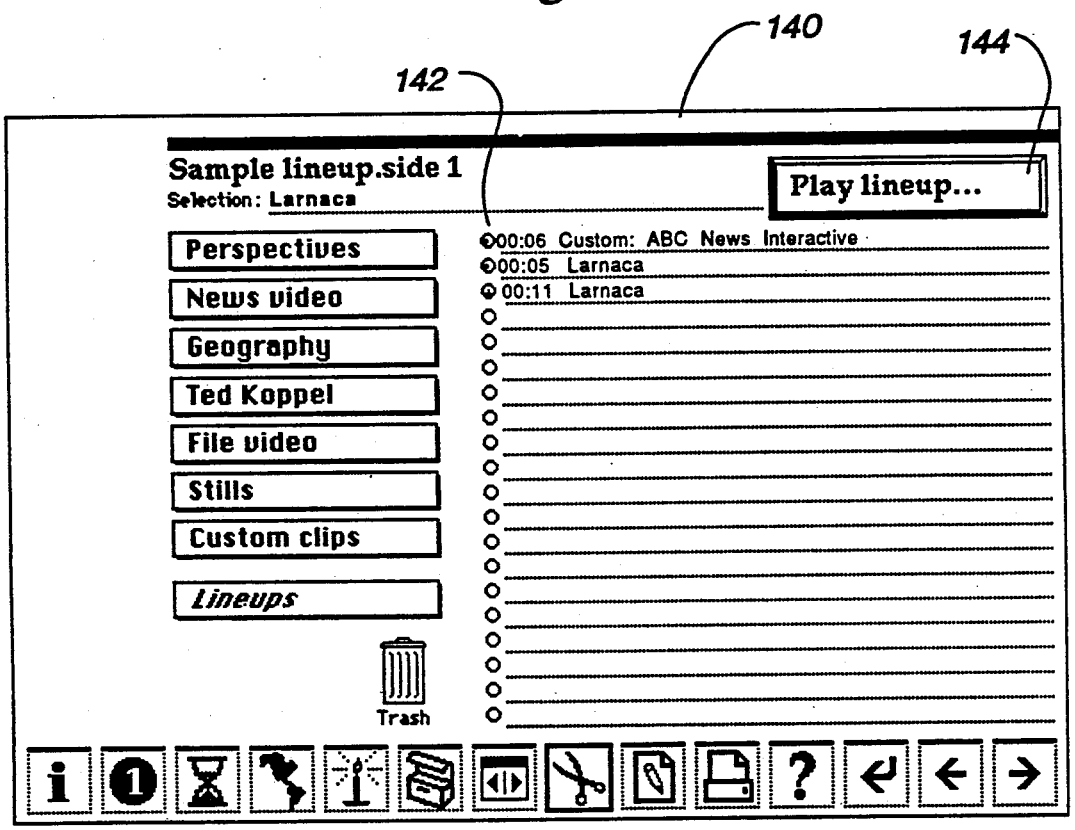
FIG. 7 is a pictorial representation showing the Lineup Maker card of FIG. 6 listing three segments of videodisc material (clips) selected for a particular custom clip.

With the Lineup Maker card 140 as shown in FIG. 6, the user can create a custom sequence of up to 20 clips. To activate the Lineup Maker card 140, the user presses and holds down the Lineups button 94. A pop-up menu will appear. In the preferred embodiment, one of the items listed in the pop-up menu is entitled Sample lineups side 1. The Sample lineups side 1 card will appear with a sample clip already present in the list on the right of the card as shown in FIG. 7.

The user may choose preselected clips available with the videodisc materials or any of the custom made and user-named clips or any combination of these two from the pop-up menu. It will appear on the selection line near the top of the card. The user man then drag the selected clip into the desired slot in the lineup. The user may duplicate any clip already on the list by holding down the option key and dragging the clip into a new slot. The user need not fill all of the slots in the lineup. To modify the speed, direction or audio setting of any clip's playback, the user may click the modifying dot "•" 142 to the left of the clip name. As the user make changes, the user can also rename the clip or add the user's own components about the clip.

To view the user sequence, the user clicks the Play lineup button 14. The user then selects one of the play options that appear on that pop-up menu. Automatic displays plays the entire sequence, clip by clip, without stopping. Blank slots are ignored. Manual display waits for a mouse click before advancing to the next clip, thereby giving the user an opportunity to pause during a presentation. Even in the manual display mode, the program will skip overblank slots. Clicking the mouse 20 while a clip is playing aborts the entire sequence when in manual mode and advances to the next event in the sequence in automatic mode.

Lineups may be saved to disk using the Save Lineup option under the Lineups pop-up menu, or retrieved from disk using the Retrieve Lineup option. The ability to save and store lineups allows the user to make use of the power of the Presentation Maker button 96. The Presentation Maker feature allows the user to combine the user selected lineups and any supplemental text the user wish, into an integrated text and video lesson.

As shown in FIG. 8, all of the control information associated with a given lineup is saved in a particular Lineup Format 199 that allows the clips associated with that Lineup to be quickly and easily recreated. The variable stored in the Lineup Format 199 are stored in text file format. In the preferred embodiment, a Lineup Format 199 will be related to a selected a side of the videodisc 14. It will be noted, however, that the variable 3,2 (Device) allows the Lineup Format 199 to be utilized with more than just the videodisc player 12 of the preferred embodiment of the present invention. In the preferred embodiment of the Lineup Format 199, the "in" points and "out" points may be stored as frame numbers, timecodes, (CD-ROM address, or track and block designations for a CD audio system.

OPERATIONAL FLOW OF THE DOCUMENTARY MAKER

Figure 9A:
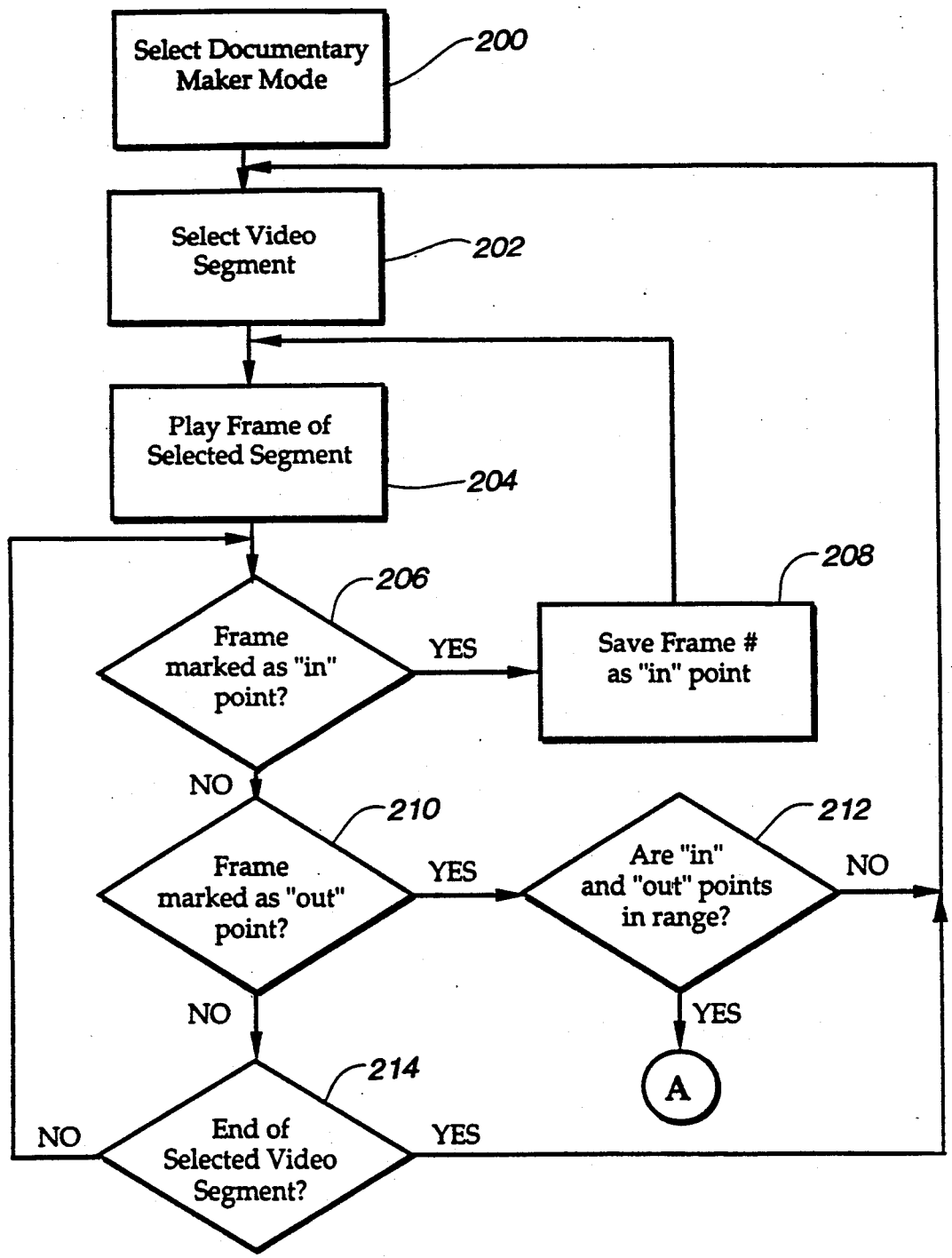
FIGS. 9a and 9b are flow diagrams showing the operational flow of the Documentary Maker.
Figure 9B:
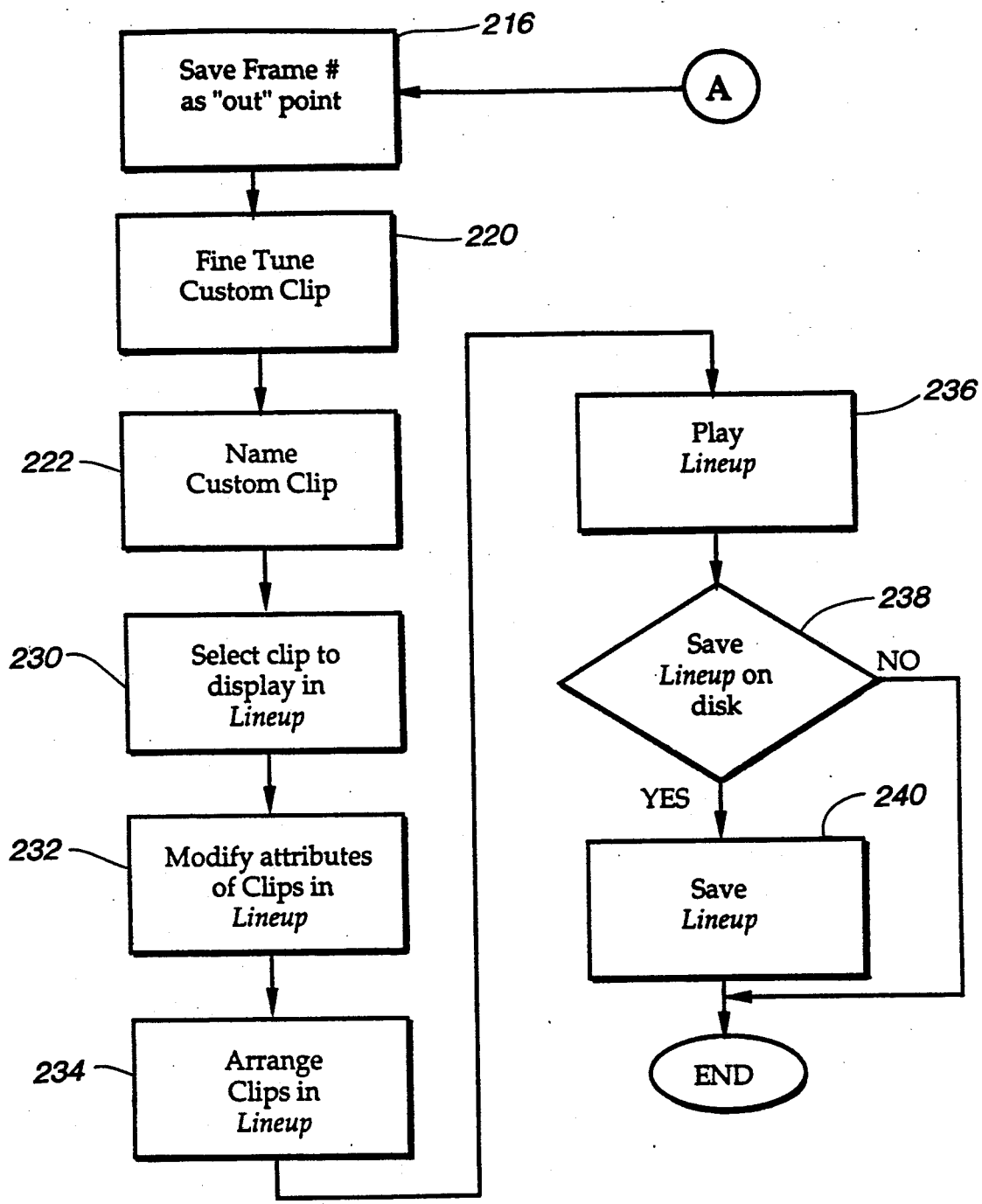

Referring now to FIGS. 9a and 9b, the programing of the preferred embodiment of the present invention will be described in terms of its operational flow. For a more detailed description of the HyperText programing language for the Documentary maker, reference is made to the program listings for three versions of the Documentary Maker that are attached hereto as Appendixes A, B and C. Appendix A contains the Documentary Maker listing from the "Vote 88" videodisc materials. Appendix B contains the Documentary Maker listing from the "In the Holylands" videodisc materials. Appendix C contains the Documentary Maker listing from the "Martin Luther King, Jr." videodisc materials.

It will be recognized that the operational flow of a HyperCard program stack is difficult to capture as each button in the stack may produce an independent operational flow; however, the general flow of steps in a typical operation will be described. In essence the previous description of the buttons associated with each of the seven cards in the Documentary Maker stack (type introduction card, (2) Presentation control cards, (2) Custom Clip Maker cards and (2) Lineup Maker cards) best describe the operational flow of the HyperCard stack. The operational flow as depicted in FIG. 8a represents only the general steps required to complete the selection, manipulation and playback of one custom made clip.

Referring now to FIG. 9a, the selection of the custom made clip is described. At step 200, the user selects the Documentary Maker mode by clicking on the Scissor button 92 in the Presentation Control card 100. At step 202, the user next selects which one of the preselected video segments will be used as the source of the video information to be included in the custom made clip by clicking on one of the large buttons 92. It will be recognized that the video information arranged in the preselected video segments could be arranged according to general topic (as shown in the preferred embodiment), or could be arranged by frame number or any other sequence as may be desired. It will also be recognized that the same section of video information may appear in more than one of the preselected video segments identified by the large buttons 92.

Operational flow proceeds to step 204 where the preselected video segment selected by the user is displayed on the monitor 16. At this point, the user is using the Custom Clip Maker card 120. The default "in" and "out" points will be the "in" and "out" points for the selected vide segment. At step 206, a check is made to see if the user has selected the frame being displayed as the "in" point for the custom made clip. If so, then the frame number of the present frame is stored as the "in" point at step 208 and operational flow continues back to step 204. At step 210, a check is made to see if the user has selected the frame being displayed as the "out" point for the custom made clip. If so, at step 212 the program checks to see if the "in" and "out" point are within the valid range of the selected video segment. If not, an error message is generated and the user is returned to select a video segment at step 202. If the present frame number is not selected as an "in" or "out" point, a check is made to see fi the preselected video segment has ended at step 214. If not, operational flow is directed back to step 204 to play the next frame of the selected video segment. If the selected video segment has ended, then the user is returned to select another video segment at step 202. The user may also go from this point to step 220 to fine tune the custom clip as described hereinafter.

Referring now to FIG. 9b, if an "in" and "out" points are within range as checked by step 212, then the frame number of the present frame is stored as the "out" point of the custom made clip at step 216 and operational flow proceeds to step 220. The user may use the Custom Clip Maker card to fine tune the start and stop points of the custom clip at step 220. It will be noted that a user may also enter the operational flow at step 220 is reediting of a previously marked custom clip is desired. At step 222, the custom clip is named and added to the pull-down list of clips using the Add Clip to List button 134. At this point, the individual custom clip has been created.

Operational flow now enters the Lineup Maker card 140. Once the custom clip has been named in step 222, it is added to the lineup showing the list of clips in card 140. At step 230, one of the custom clips or one of the preselected clips is selected as the clip to be displayed in the lineup. At step 232, the user may modify certain attributes of the selected clip by, for example, modifying the speed at which the clip is to be played back. At step 234, the user may rearrange any or all of the clips that are listed in the lineup. Each clip is represented as a uniquely selectable and modifiable button in terms of how the HyperCard program views the clips. Once the clips are in the desired order as selected by the user, the user may play back the lineup at step 236 by clicking on the Play Lineup button 144. A check is made to see whether the user wants to save the Lineup associated with the selected clip at step 238. If so, then at step 240 the Lineup is saved on a disc associated with the computer 10 using the Lineup Format 199 as previously described.

TEXTUAL TRACKING FEATURE

Figure 10:
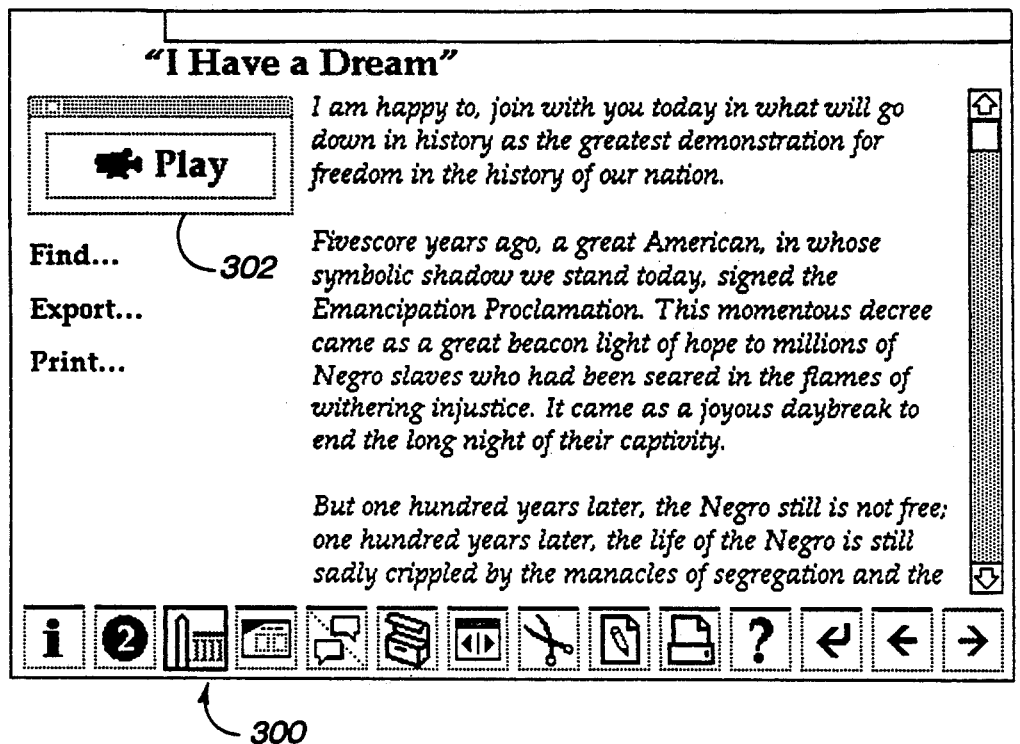
FIGS. 10 and 11 are pictorial representations showing the Textual Tracking card of the present invention.
Figure 11:
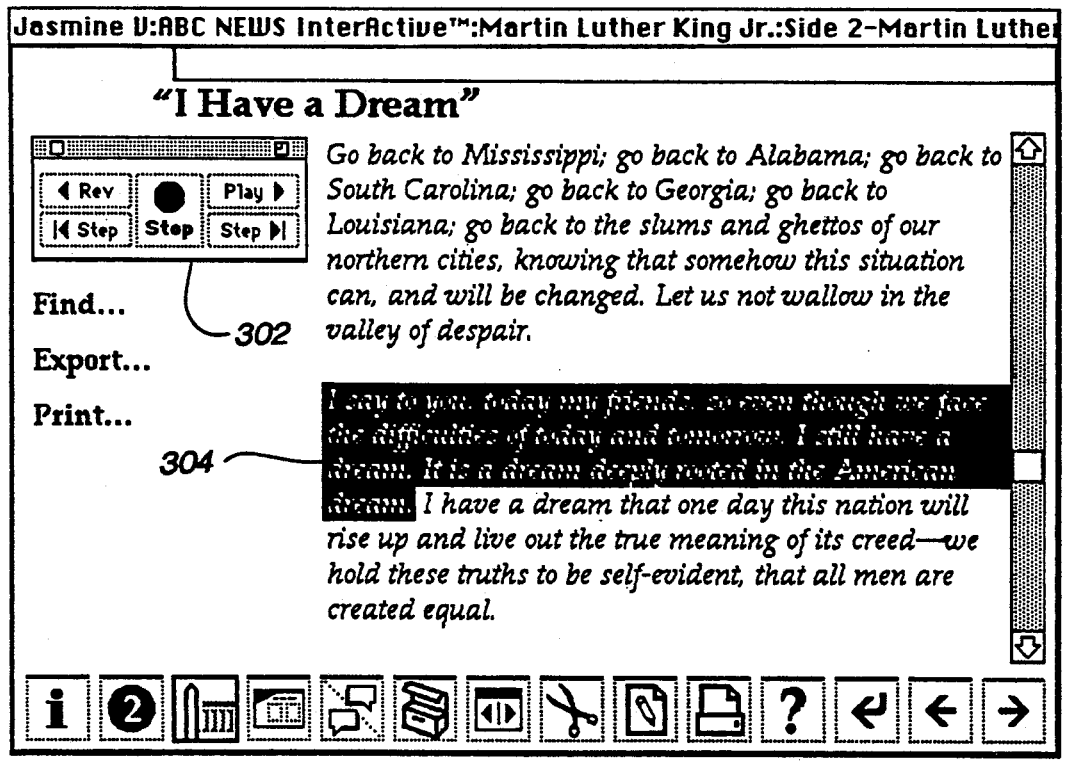

An additional feature of the present invention known as Textual Tacking is shown and described in connection with FIGS. 10 and 11. In the preferred embodiment, a Textual tracking card 300, as shown in FIGS. 10 and 11, is used to present textual information associated with a given video segment. The textual information may be the actual text of the audio portion of the video segment, or may be editorial or other information, such as charts, graphs, equations, etc. The textual information is presented along the righthand side of the card 300 and a play video button 302 is present in the upper lefthand corner of the card 300. As shown in FIG. 11, the user selects the desired portion 304 of the textual information by highlighting the desired portion 304 using either the cursor or mouse associated with the computer 10. When the user clicks on the play video button 302, the computer searches through a catalog file associated with the given video segment and identifies the "in" point and "out" point related to the desired portion 304. In the preferred embodiment, each sentence of the textual information is identified by an "in" and "out" point that is stored in the catalog file. It will be apparent, however, that the catalog points associated with the textual information could be divided in any manner desired and that it is also possible to concatenate catalog points to create strings of video information associated with the desired portion 304 of the textual information. For a more detailed description of the HyperText stack for the Textual Tracking feature, reference is made to the Side 2 program listing of the "Martin Luther King, Jr." videodisc materials.

USING THE PRESENT INVENTION

The Documentary Maker feature of the present invention allows students to reference specific videodisc visuals within their research report using the Macintosh computer 10. Inclusion of the visuals serves to reinforce the student's written words and provides the teacher with an additional means of assessing comprehension. This feature allows both the student and teacher to experience an exciting new twist to traditional library research.

Some sample activities to be used with the Documentary Maker and a videodisc 14 might be to have the students choose clips that best express the following: a) Sanctuary vs. Struggle, b) Independence vs. Catastrophe; or c) Terror vs. Defiance. Another example would be to have the student prepare a statement of the Israelis's point of view or a Palestinian statement using clips from at least six segments. The student could then prepare a balanced view of the situation using at least eight clips.

Although the description of the preferred embodiment has been presented, it is contemplated that various changes could be made without deviating from the spirit of the present invention. Accordingly, it is intended that the scope of the present invention be dictated by the appended claims rather than by the description of the preferred embodiment.

I claim:

1. In a system having information recorded on a single recording medium only a portion of which is to be displayed, the information comprising one or more prerecorded segments of video information, each segment comprising one or more frames of video information, the improvement comprising:

means for identifying on what portion of the recording medium the desired information is located;

means for selecting any portion of the desired information for display in an interactive, individually controlled, user-selectable order;

means for storing the start point and stop point of the information to be displayed as a custom clip, including means for storing the start point and stop points for one or more custom clips in the user-selectable order; and means for displaying from the single recording means only that portion of information selected by the selection means and stored by the storage means as custom clips in the user-selectable order.

2. An interactive video control system for use with a videodisc player capable of playing a videodisc having one or more prerecorded segments of video information, each segment comprising one or more frames of video information:

means for selecting clips of the video information in an interactive, individually controlled, user-selectable order by identifying user-selected start frames and stop frames for displaying the clip of the video information;

means for establishing an ordered sequence of clips from the videodisc; and means for displaying the sequence of clips in the order established by the establishing means.

3. An interactive video control system for displaying a sequential series of one or more video clips, said system comprising:

a player unit for displaying stored video information;

a driver system in communication with said player unit so as to direct its functions for identifying, locating and displaying said stored video information; and an interactive user interface comprising:

identifying means for generating one or more commands to said driver system for the purpose of identifying an interactive, individually controlled, user-selectable order of said clips by designation of a starting point and a stopping point;

individual display means for generating one or more commands to said driver system for the purpose of individually displaying said clips;

sequencing means for designating a prescribed order for sequential display of said clips;

sequential display means for generating one or more commands to said driver system for the purpose of sequentially displaying said clips in said prescribed order; and a driver interface connecting said user interface and said driver system for conveying commands generated by said user interface to said driver system such that said commands are interpreted by said driver system and used by said driver system to direct the functions of said player so as to effectuate the purpose of said commands dictated by said user interface.

4. An interactive video control system comprising:
a videodisc player having a videodisc with information prerecorded on the videodisc;
at least one automated driver for the videodisc player; and
a computer system having
input means for controlling through the driver the videodisc player;
means for receiving through the input means fields of information designating the amount and content of prerecorded information to be displayed by the display means;
programming means for controlling the videodisc player through the driver so that the amount and content of prerecorded information entered into the input means is immediately displayed by the display means, wherein the programing means comprises:
means for selectively displaying all or any portion of the prerecorded information in an interactive, individually controlled, user-selectable series; and
the order of the series in a sequence being established by successive fields of information entered into the input means.

5. The interactive video control system of claim 4 wherein the prerecorded information is organized in segments and wherein the amount and content of prerecorded information for any one or more of the series of segments can be varied by re-entering the field of information which corresponds to that segment.

6. The interactive video control system of claim 5 wherein any selected segment can be shown manually or in any preselected sequenced entered into the input means and wherein the amount and content of the prerecorded information can be changed at any time by changing the field of information corresponding to that segment.

7. The interactive video control system of claim 6 wherein any change made to a field of information relating to the amount and content of prerecorded information that is to be displayed is published to all portions of the programming means which relate to that selected segment.

8. A method for controlling the presentation of information previously recorded on a single recording medium using a computer and a playback device and a display monitor for playing the information recorded on the single recording medium, the method comprising the steps of:
(a) using the computer and a list of segments stored on the computer of the prerecorded information on the recording medium, interactively selecting one or more individually controlled, user-selectable segments of the information to be played for user using the playback device and the display monitor;
(b) playing a frame associated with the segment;
(c) using the computer to check whether the user has designated the frame as an "in" point for a user-selected clip, and, if so, saving the frame number as the "in" point for the user-selected clip;
(d) using the computer to check whether the user has designated the frame as an "out" point for a user-selected clip, and, if so, saving the frame number as the "out" point for the user-selected clip; and
(e) using the computer to check whether the frame is the last frame of the selected segment and, if not, incrementing the frame number and repeating steps (b)–(e).

9. The method of claim 8 further comprising the step of:
(f) using the computer and the playback device to play the information associated with the user-selected clip to fine tune the "in" and "out" points.

10. The method of claim 9 further comprising the step of:
(g) using the computer to select one or more user-selected clips and preselected clips to be displayed using the playback device by selecting the name of the user-selected clip from a plurality of clips stored in a lineup;
(h) using the computer to modify any of one or more attributes associated with the selected user clip;
(i) using the computer to arrange the order to the plurality of clips in the lineup by allowing the user to organize the order of an icon associated with each clip; and
(j) playing the information identified by the lineup on the display using the playback device.

11. The method of claim 10 wherein control information associated with the lineups may be stored and retrieved from a memory accessible by the computer.

12. A method for controlling the presentation of visual information previously recorded on a single recording medium and associated textual information stored on a computer memory using a computer and a playback device and a display monitor for playing the information recorded on the single recording medium and a computer screen for displaying the associated textual information, the method comprising the steps of:
(a) using the computer and a list of segments stored in the memory of the computer of the prerecorded visual information on the recording medium, interactively selecting one or more individually controlled, user-selectable segments of the visual information to be played for a user using the playback device and the display monitor;
(b) displaying the textual information associated with the selected segment on the computer screen;
(c) allowing the user to select a portion of the textual information displayed on the computer screen for identifying the related portion of the visual information to be played using the playback device and the display monitor; and
(d) using the computer and a cataloged means for storing the "in" and "out" points associated with a predefined section of the textual information associated with the selected segment to playback the portion of the selected segment associated with the selected portion of the textual information.

13. The method of claim 12 wherein the predefined sections of the textual information are sentences.

14. The method of claim 12 wherein the predefined sections of the textual information are phrases.

15. The method of claim 12 wherein the predefined sections of the textual information are words.

16. The method of claim 12 wherein the predefined sections of the textual information are paragraphs.

* * * * *